United States Patent Office 3,069,417
Patented Dec. 18, 1962

3,069,417
STEROID KETALS OF THE PREGNANE SERIES
Martin J. Weiss, Oradell, N.J., and John F. Poletto and Henry M. Kissman, Nanuet, N.Y., assignors to American Cyanamid Company, New York, N.Y., a corporation of Maine
No Drawing. Filed Jan. 30, 1961, Ser. No. 85,507
13 Claims. (Cl. 260—239.55)

This invention relates to 20-ketals of the pregnane series. More particularly, it relates to 3-keto-1,4-pregnadiene 20-ketals, intermediates and methods of preparing the same.

The novel compounds of this invention can be illustrated by the following general formula:

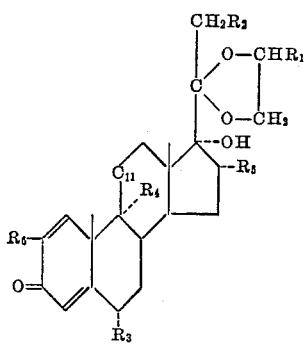

wherein $C_{11}$ is a divalent radical of the group consisting of

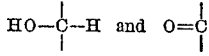

$R_1$ is a member of the group consisting of hydrogen and lower alkyl radicals; $R_2$ is a member of the group consisting of hydrogen, hydroxyl and lower alkanoyloxy radicals; $R_3$ is a member of the group consisting of hydrogen and lower alkyl radicals; $R_4$ is a member of the group consisting of hydrogen and halogen radicals; $R_5$ is a member of the group consisting of hydrogen, hydroxyl, lower alkanoyloxy and lower alkyl radicals and $R_6$ is a member of the group consisting of hydrogen and lower alkyl radicals. This invention also includes compounds of the group consisting of 21-lower alkanoyloxy-20-lower alkylenedioxy-11$\beta$,17$\alpha$ - dihydroxy-6$\alpha$-methyl-4-pregnen - 3 - ones; 20-lower alkylenedioxy-6$\alpha$-methyl-11$\beta$,17$\alpha$,21 - trihydroxy-4-pregnen-3-ones; 21-lower alkanoyloxy-20-lower alkylenedioxy - 11$\beta$,17$\alpha$ - dihydroxy-2$\alpha$,6$\alpha$-dimethyl-4-pregnen-3-ones; 20-lower alkylidenedioxy-2$\alpha$,6$\alpha$-dimethyl - 11$\beta$,17$\alpha$,21-dihydroxy-4-pregnen-3-ones and 20-lower alkylidenedioxy - 2 - lower alkoxalyl-6$\alpha$-methyl-11$\beta$,17$\alpha$,21-trihydroxy-4-pregnen-3-ones.

The present compounds are at least somewhat soluble in the usual organic solvents and relatively insoluble in water. They are, in general, solids having a relatively high melting point, usually above 150° C.

The novel 20-ketals of this invention are prepared by ketalization methods described in the chemical art. Generally, the procedure comprises heating a 20-keto steroid with a 1,2-glycol for example, ethylene glycol, 1,2-propanediol, etc. usually in an inert solvent such as, for example, benzene, toluene or the like in the presence of catalytic amounts of acidic reagents such as, for example, p-toluenesulfonic acid. The temperature may vary from about 60° C. to 120° C. and the reaction is usually complete in from about four to eight hours. It is often expedient in carrying out the reaction to use a water separator. The reaction product is then ordinarily obtained by crystallization, and if necessary, chromatography. Under such conditions, the $\Delta^{1,4}$-3-keto- and 11-keto systems do not undergo ketalization. However, if the starting steroid is a $\Delta^4$-3-ketone rather than a $\Delta^{1,4}$-3-ketone, ketalization will be effected at the 3-position as well as at the 20-position thus yielding, in major proportion, a 3,20-bis-ketal. Such 3,20-bis-ketals, however, may, in general, be converted to their desired 20-ketal counterparts (if necessary, after first acylating the 21-hydroxyl grouping) by mild hydrolysis (such as with aqueous acetic acid or the like), thereby preferentially de-ketalizing the 3-position. For 20-ketalization, it is preferable to use an 11-keto derivative rather than an 11$\beta$-hydroxy derivative. The 11$\beta$-hydroxy group may be introduced subsequently by a metal hydride reduction of the 11-carbonyl group. During this latter reduction, both the 3- and 20-keto groups have to be blocked, preferably by ethylenedioxy groups. It is also preferable to carry out the ketalization reaction in the presence of a free 21-hydroxyl rather than a 21-acyloxy derivative. 21-acyloxy derivatives can be conveniently prepared from the 21-ol-20-ketal by the usual mild acylation procedure, for example, with acetic anhydride in pyridine solution. When necessary, 1-dehydrogenation of $\Delta^4$-3-ketones may be effected by treating with 2,3-dichloro-5,6-dicyanobenzoquinone or with selenium dioxide.

The synthesis of representative 20-ketals of this invention is shown by the following equations.

A.

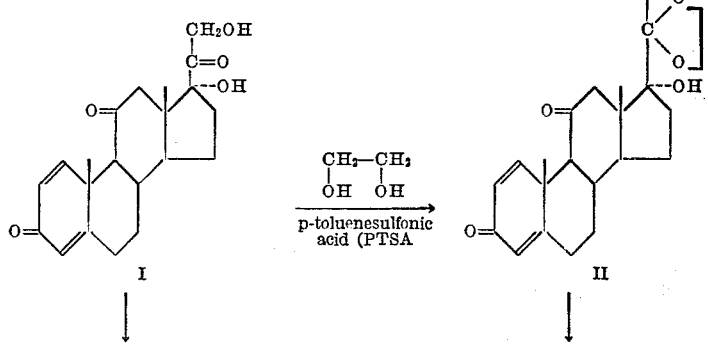

3,069,417
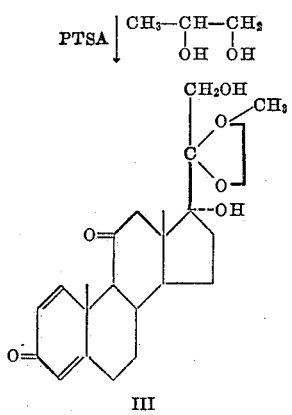
III
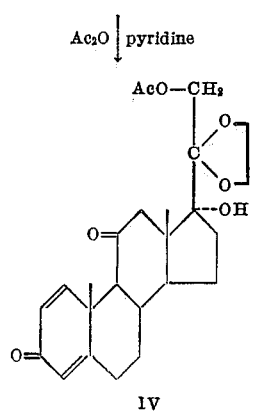
IV
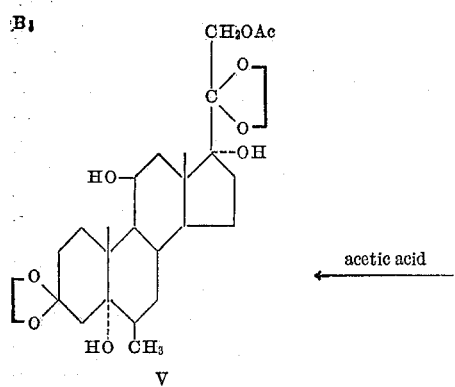
V
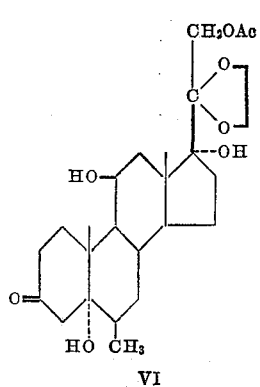
VI
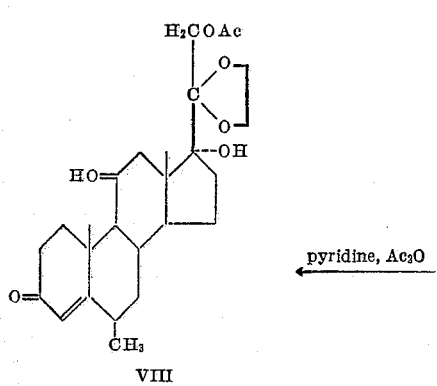
VIII
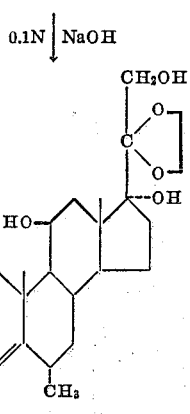
VII
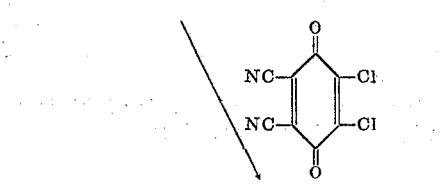
IX C.
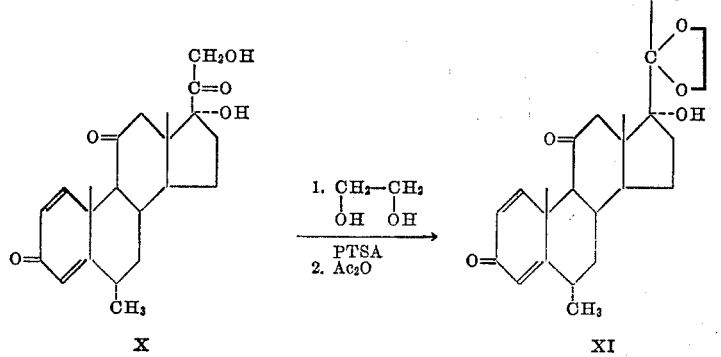
D.
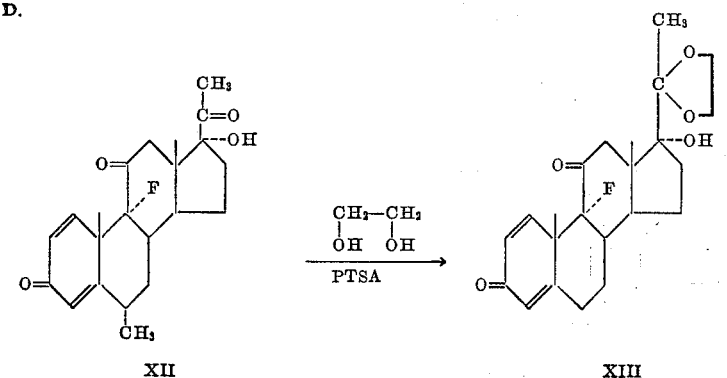
E.
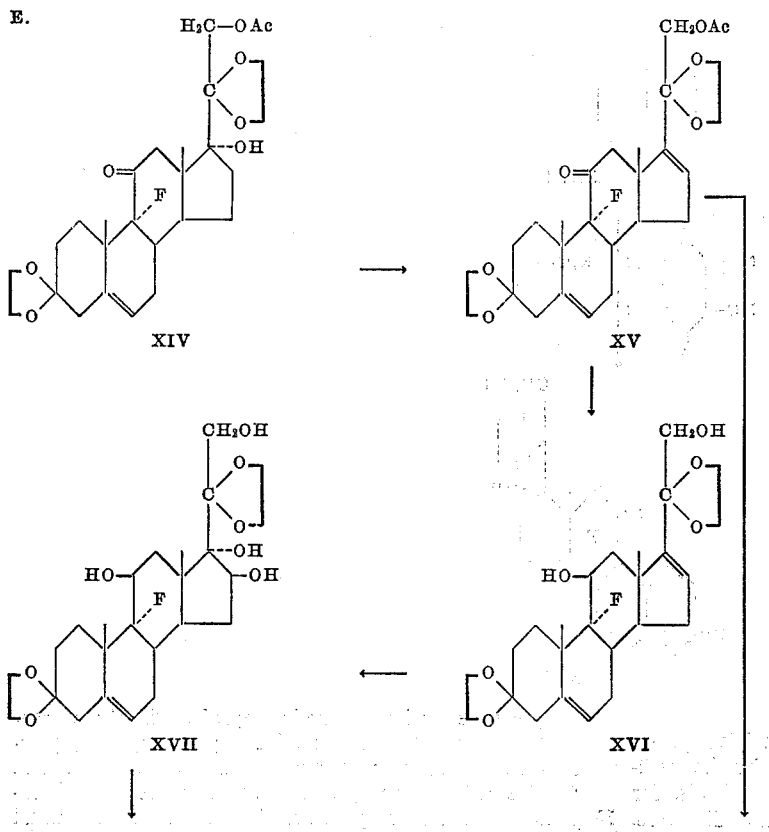

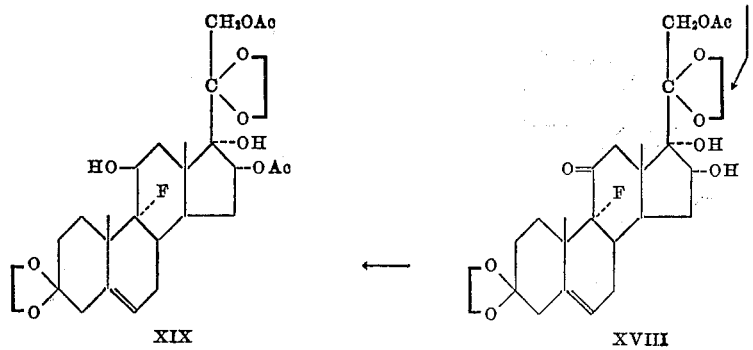

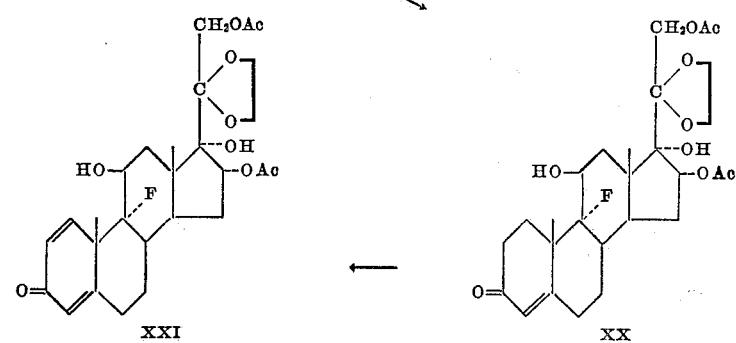

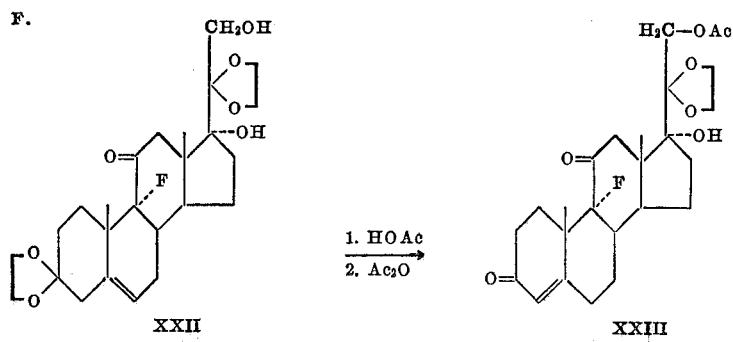

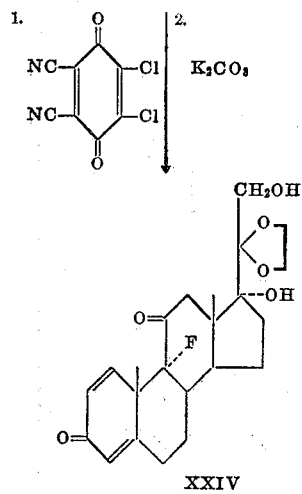

in which Ac is a lower alkanoyl radical.

The novel compounds of this invention have potent corticoid activity and therefore are useful for the treatment of various collagen diseases such as arthritis, for the treatment of asthma and dermatological disorders. They can be used as the active ingredient in pharmaceutical preparations such as tablets, pills, capsules, powders and topical preparations such as ointments, etc. and the like which also may include one or more other therapeutically active components. In these forms the usual inert ingredients necessary to the compounding of the pharmaceutical preparations are understood to be present. Also, the 2-alkoxalyl steroids are useful as intermediates and can be converted into the corresponding 2-fluoro steroids and other useful corticoids.

The following examples describe in detail the preparation of representative compounds of the present invention and in the examples melting points are taken in an open capillary tube and are uncorrected. The ultraviolet spectra are determined in methanol on a Cary recording spectrophotometer and the infrared spectra (pressed potassium bromide discs) are carried out with a Perkin-Elmer spectrophotometer (model 21). Polarimetric data is obtained in chloroform solution unless stated otherwise. All evaporations are carried out under reduced pressure. Except where otherwise noted, the petroleum ether used is that fraction boiling at 60–70° C.

EXAMPLE 1

*Preparation of Prednisone 20-Ethylene Ketal (17α,21-Dihydroxy - 20 - Ethylenedioxy-1,4-Pregnadiene-3,11-Dione, II)*

A solution of 17α,21 - dihydroxy - 1,4 - pregnadiene-3,11,20-trione (prednisone, I) (5 g.) in benzene (275 ml.) is refluxed with ethylene glycol (35 ml.) containing p-toluenesulfonic acid monohydrate (175 mg.) for 4½ hours using a water trap. The mixture is cooled, neutralized with sodium bicarbonate and the benzene layer separates. This layer is washed to neutrality, dried and evaporated to give a glass which resists crystallization. The ethylene glycol layer is then extracted with ethyl acetate after addition of water. The ethyl acetate extract is washed to neutrality, dried and evaporated. The residue is slurried with acetone to give 1.8 g. of (II), melting point 230–232°; negative α-ketol test. A mixed melting point with starting material (I) shows a depression, melting point 201–208°. Crystallization from chloroform-acetone raises the melting point to 231–233° C.

Infrared analysis indicates solvation with chloroform.

A portion of the above material is crystallized from ethyl acetate-petroleum ether (90–100°) giving material melting at 232–234° C.; $[\alpha]_D^{25}+115°$, $+101°$, $+116°$;

$\lambda_{max.}^{MeOH}$ 237 m$\mu$ ($\epsilon_{1\%}^{1cm.}$ 341); infrared analysis indicated solvation with ethyl acetate, $\nu_{max.}^{KBr}$ 3670, 1746, 1710, 1666, 1622, 1604, 1210, 1046, 896 and 675 cm.$^{-1}$

EXAMPLE 2

*Preparation of Prednisone 20-Ethylene Ketal 21-Acetate (21-Acetoxy-20-Ethylenedioxy - 17α - Hydroxy - 1,4-Pregnadiene-311-Dione, IV)*

17α,21 - dihydroxy - 1,4 - pregnadiene - 3,11 - dione 20-ethylene ketal (II, Example 1) (300 mg.) is acetylated in the usual maner with acetic anhydride in pyridine solution. Crystallization of the product from acetone-petroleum ether gives 0.23 g., melting point 207–209° C. (70%). Recrystallization from the same solvent pair did not change the melting point; $[\alpha]_D^{25}+132°$ (chloroform);

$\lambda_{max.}^{MeOH}$ 237 m$\mu$ ($\epsilon$15,500); $\nu_{max.}^{KBr}$ 3364, 1754, 1706, 1666, 1624, 1608, 1226 and 1046 cm.$^{-1}$ In a similar manner treatment of II with propionic anhydride in pyridine solution gives the corresponding 21-propionate.

EXAMPLE 3

*Preparation of Prednisone 20-Propylene Ketal (17α,21-Dihydroxy - 20 - Propylenedioxy - 1,4 - Pregnadiene-3,11-Dione, III)*

A mixture of 17α,21 - dihydroxy - 1,4 - pregnadiene-3,11,20-trione (I) (4.0 g.), benzene (250 ml.), 1,2-propanediol (30 ml.), and p-toluenesulfonic acid monohydrate (150 mg.) is stirred and refluxed for 4½ hours with constant water takeoff. After the usual workup, a glass is obtained which crystallizes on the addition of benzene. The solid is collected by filtration giving 1.22 g. (26%), melting point 148–152° C. negative α-ketol test with blue tetrazolium. Recrystallization from acetone-benzene raises the melting point to 156–159° C.; $[\alpha]_D^{25}+109°$ (chloroform);

$\lambda_{max.}^{MeOH}$ 238 m$\mu$ ($\epsilon$14,900); $\nu_{max.}^{KBr}$ 3424, 1708, 1670, 1630, 1610, 1043 and 6.87 m$\mu$ (benzene)

EXAMPLE 4

*Preparation of Prednisone 20-Propylene Ketal 21-Acetate (21 - Acetoxy - 17α - Hydroxy - 20 - Propylenedioxy-1,4-Pregnadiene-3,11-Dione)*

Prednisone 20-propylene ketal (III, Example 3) (300 mg.) is acetylated in the usual manner with acetic anhydride in pyridine solution. Water is added to the reaction solution and the mixture is extracted with ethyl acetate. The extract is washed with water, dried over anhydrous magnesium sulfate and evaporated to dryness. The residual semi-solid is crystallized from acetone-petroleum ether to yield 209 mg., melting point 197.5–198.5° C. (63%); $[\alpha]_D^{25}+119°$ (chloroform);

$\lambda_{max.}^{MeOH}$ 238 m$\mu$ ($\epsilon$15,300); $\nu_{max.}^{KBr}$ 3260, 1752, 1714, 1670, 1636, 1612, 1244 and 1048 cm.$^{-1}$ In a similar manner, treatment of compound III with propionic anhydride or butyric anhydride in pyridine solution gives the corresponding 21-propionate and 21-butyrate, respectively.

EXAMPLE 5

*Preparation of 6α-Methylhydrocortisone 20-Ethylene Ketal (20-Ethylenedioxy-6α-Methyl-11β,17α,21-Trihydroxy-4-Pregnen-3-One, VII)*

To 2.3 g. (0.0044 moles) of 21-acetoxy-3,20-bisethylene-dioxy-6β-methylpregnane-5α,11β,17α-triol (V) [Bernstein et al., J. Amer. Chem. Soc. 82, 1235 (1960)] in 30 ml. of glacial acetic acid heated on a steam bath is added 10 ml. of water. Heating is continued for 40 minutes after which time 70 ml. of water is added. The product crystallizes out. The reaction mixture is cooled to 0° and the product is filtered. The yield of crude 21-acetoxy - 20 - ethylenedioxy-5α,11β,17α-trihydroxy - 6β-methylpregnan-3-one (VI) is 1.4 g. (66%), melting point 245–247° C. A sample is recrystallized twice from acetone-petroleum ether to give pure product, melting point 255–256° C.; $[\alpha]_D^{25}\pm0$ (chloroform);

$\nu_{max.}^{KBr}$ 3544, 1750, 1718, 1228 and 1050 cm.$^{-1}$

To 1 g. (0.002 mole) of 21-acetoxy-20-ethylenedioxy-5α,11β,17α-trihydroxy-6β-methylpregnan-3-one (VI) in 86 ml. methanol under a stream of nitrogen is added 86 ml. of 0.1 N sodium hydroxide. The solution is allowed to stand for 17 hours at room temperature under nitrogen and 1.05 ml. of acetic acid is added. The solution is concentrated (the bath temperature is maintained at 60° or below) until crystals form. The mixture is chilled and the product (VII) is filtered; 0.4 g. (46%); melting point 223–225° C. A sample is recrystallized twice from acetone-petroleum ether to give material melting at 232–233° C.; $[\alpha]_D^{25}+76.3$, (chloroform);

$\lambda_{max.}^{MeOH}$ 241 m$\mu$ ($\epsilon$14,400); $\nu_{max.}^{KBr}$ 3490, 1680, 1668 (shoulder), 1614 and 1050 cm.$^{-1}$ A 30 g. further experiment gives 22.5 g. (85.5%) of product (VII), melting point 227–229° C.

EXAMPLE 6

*Preparation of 6α-Methylhydrocortisone 20-Ethylene Ketal 21-Acetate (21-Acetoxy-11β-17α-Dihydroxy-20-Ethylenedioxy-6α-Methyl-4-Pregnen-3-One, VIII)*

A solution of 6α-methylhydrocortisone 20-ethylene ketal (VII, Example 5) (1 g.) in pyridine (10 ml.) is treated with acetic anhydride (3 ml.) for 16 hours at room temperature. Ice water is added and the mixture is extracted with chloroform. The extract is washed with water, dried and evaporated. This gives a glass which, when crystallized from acetone-petroleum ether, yields 1.0 g. (95%), melting point 180–181° C. Two recrystallizations from the same solvent pair gives product with melting point 182–183° C. (plates). A further recrystallization from the same solvent pair raises the melting point to 195–196° C. (needles); $[\alpha]_D^{25}+680$ (chloroform);

$\lambda_{max.}^{MeOH}$ 242 m$\mu$ ($\epsilon$14,900); $\nu_{max.}^{KBr}$ 3392, 1740, 1650, 1602, 1234 and 1052 cm.$^{-1}$ In a similar manner, treatment of compound VII with propionic anhydride or butyric anhydride in pyridine solution gives the corresponding 21-propionate or 21-butyrate.

EXAMPLE 7

*Preparation of 6α-Methylprednisolone 20-Ethylene Ketal 21-Acetate (21-Acetoxy-20-Ethylenedioxy-11β,17α-Dihydroxy-6α-Methyl-1,4-Pregnadiene-3-One, IX)*

A solution of 11β,17α,21-trihydroxy-6α-methyl-4-pregnene-3-one 20-ethylene ketal (VII, Example 5) (3 g.) in a mixture of tertiary-butanol (300 ml.) and water (21 ml.) containing selenium dioxide (3 g.) is refluxed for a period of 50 hours. The metallic residue is removed by filtration and the filtrate neutralized with saturated sodium bicarbonate solution. The mixture is evaporated and the residue triturated with chloroform. This solution is then dried over anhydrous magnesium sulfate and evaporated. This gives a glass which, upon treatment with methanol, yielded an insoluble material which is removed by filtration. The methanol solution is treated by deactivated Raney nickel for a period of two hours at room temperature. The Raney nickel is removed by filtration and the filtrate evaporated. The residue is dissolved in benzene and chromatographed on silica gel. Elution with chloroform gives a mixture of products and the eluates are combined and evaporated. The residue which contained 6α-methylprednisolone 20-ethylene ketal is acetylated under the usual mild conditions and after workup, partition chromatography on diatomaceous earth with the system; heptane: 5; ethyl acetate: 2; methanol: 5; water: 2 gives two minor non-polar components absorbing at 240μ. These are set aside and the column is washed with methanol. The methanol wash is evaporated to dryness and the residue crystallized from acetone petroleum ether to give 231 mg. of (IX), melting point 206–209° C. (9%). Recrystallization from the same solvent pair raised the melting point to 213–215° C.; $[\alpha]_D^{25}+35°$ (chloroform);

$\lambda_{max.}^{MeOH}$ 243 m$\mu$ ($\epsilon$14,500); $\lambda_{max.}^{KBr}$ 3440, 1750, 1662, 1610, 1252, 1052 and 890 cm.$^{-1}$

EXAMPLE 8

*Preparation of 6α-Methylprednisolone 20-Ethylene Ketal 21-Acetate (IX)*

A solution containing 6α-methylhydrocortisone 20-ethylene ketal 21-acetate (VIII, Example 6) (1.2 g) and 2,3-dichloro-5,6-dicyano-1,4-benzoquinone [E. A. Braude et al., J. Chem. Soc., 3569 (1959)] (0.8 g.) in dioxane (100 ml.) is refluxed for five days. The residue obtained on evaporation to dryness is taken up in benzene containing a small amount of ethyl acetate. The extract is washed with water, cold 1% aqueous potassium hydroxide solution (3x) and finally with water repeatedly until the washings are neutral. The washed solution is then dried and evaporated to give a solid residue which, on recrystallization from acetone-petroleum ether, gives 710 mg. of IX, melting point 212–214° C. The infrared spectrum is identical to that of the product obtained by selenium dioxide dehydrogenation (Example 7). Polarographic analysis indicates the presence of more than 90% $\Delta^{1,4}$-3-one.

EXAMPLE 9

*Preparation of 6α-Methylprednisone 20-Ethylene Ketal 21-Acetate (21-Acetoxy-20-Ethylenedioxy-17α-Hydroxy-6α-Methyl-1,4-Pregnadiene-3,11-Dione, XI)*

A benzene solution (55 ml.) containing 6α-methylprednisone (X) [Spero et al., J. Amer. Chem. Soc., 78, 6213 (1956)] (1.0 g.), ethylene glycol (7 ml.), p-toluenesulfonic acid (PTSA) (35 mg.) is refluxed 4½ hours (water trap). Excess solid sodium bicarbonate is added, the mixture is cooled, water is added and the combined phases are extracted with ethyl acetate (400 ml.). The extract is washed to neutrality with saturated saline solution, dried over anhydrous magnesium sulfate and evaporated to dryness. The resulting hard glass gives a slightly positive α-ketol test and cannot be crystallized. It is dissolved in benzene and chromatographed on silica gel (30 g.). An initial fraction (0.15 g.) obtained by elution with chloroform is discarded. Elution with acetone gives a second fraction (0.75 g.) which gives a negative α-ketol test. This material (6α-methylprednisone 20-ethylene ketal) is acetylated with acetic anhydride in pyridine solution in the usual manner to give a glass which crystallizes when triturated with ether, giving 215 mg. of product (XI), melting point 170–172° C. Several recrystallizations from acetone-petroleum ether raises the melting point to 173–174° C.; $[\alpha]_D^{25}+109°$ (chloroform);

$\lambda_{max.}^{MeOH}$ 235 m$\mu$ ($\epsilon$16,800); $\nu_{max.}^{KBr}$ 3596, 1746, 1707, 1665, 1624, 1603, 1238 and 1044 cm.$^{-1}$

EXAMPLE 10

*Preparation of 20-Ethylenedioxy-9α-Fluoro-17α-Hydroxy-6α-Methyl-1,4-Pregnadiene-3,11-Dione (XIII)*

To a previously prepared and cooled mixture of chromium trioxide (1.2 g.) in pyridine (15 ml.) is added a cooled solution of 9α-fluoro-11β,17α-dihydroxy-6α-methyl-1,4-pregnadiene-3,20-dione (German Patent 1,056,605, May 6, 1959) (1.3 g.) in pyridine (20 ml.) and the mixture is stirred for 2½ hours at room temperature. The mixture is poured into ice water containing potassium carbonate and the product is extracted with chloroform. The extract is washed to neutrality with water, dried and evaporated. The solid residue is crystallized from acetone-petroleum ether to give 0.81 g. (62%) of 9α-fluoro-17α-hydroxy-6α-methyl-1,4-pregnadiene-3,11,20-trione, melting point 230–233° C. Three recrystallizations of a portion raises the melting point to 247–248° C.; $[\alpha]_D^{25}+92°$ (dioxane);

$\lambda_{max.}^{MeOH}$ 233 m$\mu$ ($\epsilon$15,800); $\nu_{max.}^{KBr}$ 3460, 1724, 1708, 1626 and 1612 cm.$^{-1}$ A stirred mixture containing 9α-fluoro-17α-hydroxy-6α-methyl-1,4-pregnadiene-3,11,20-trione (XII) (0.6 g.), benzene (100 ml.), ethylene glycol (8 ml.) and p-toluenesulfonic acid monohydrate (35 mg.) is heated at reflux for a period of five hours using a water separator. The solution is cooled, neutralized with sodium bicarbonate solution, water is added and the mixture is extracted with ethyl acetate. The extract is washed with water, dried and evaporated. The solid residue is recrystallized from acetone-petroleum ether to give 479 mg. of XIII, melting point 237–239° C. (71%). Recrystallization from the same solvent pair raises the melting point to 243–245° C.; $[\alpha]_D^{25}+79°$ (dioxane);

$\lambda_{max.}^{MeOH}$ 237 m$\mu$ ($\epsilon$14,900); $\nu_{max.}^{KBr}$ 3494, 1722, 1670, 1638, 1614 and 1052 cm.$^{-1}$

EXAMPLE 11

*Preparation of 21-Acetoxy-3,20-Bisethylenedioxy-9α-Fluoro-17α-Hydroxy-5-Pregnen-11-One (XIV)*

A mixture of 9α-fluoro-17α,21-dihydroxy-4-pregnene-3,11,20-trione [Fried et al., J. Amer. Chem. Soc., 79, 1130 (1957)] (5.6 g.) and ethylene glycol (125 ml.) is concentrated to a volume of 100 ml. under reduced pressure (2 mm.) at a still-head temperature of 100°. Paratoluenesulfonic acid monohydrate (225 mg.) is added and slow distillation continues with vigorous stirring for a period of 2½ hours. The mixture is neutralized with aqueous potassium hydroxide solution (3 ml., 10%) and water is added. Chloroform is added and the layers separate. The aqueous layer is extracted with chloroform and the chloroform extracts combined. The organic extract is washed with water, dried over anhydrous magnesium sulfate and evaporates. This gives a glassy residue which, when slurried with acetone, yields a crystalline product, 3,20-bisethylenedioxy-9α-fluoro-17α,21-dihydroxy-5-pregnen-11-one (XXII) (1.38 g., melting point 241–244° C.). Concentration of the mother liquor yields an additional 0.51 g., melting point 242–245° C. (total yield 27%). Both fractions give negative α-ketol tests with blue tetrazolium. Recrystallization of the main portion raises the melting point to 251–253°; $[\alpha]_D^{25}$ —34° (chloroform);

$\lambda_{max.}^{MeOH}$ none at a concentration of 20 γ/ml.; $\nu_{max.}^{KBr}$ 3570, 1722, 1680, 1094 and 1054 cm.$^{-1}$ A solution of 3,20-bisethylenedioxy-9α-fluoro-17α,21-dihydroxy-5-pregnen-11-one (XXII) (2.17 g.) in pyridine (35 ml.) is treated with acetic anhydride (10 ml.) and allowed to stand 50 hours at room temperature. The mixture is poured into ice water and the crystalline product (XIV) collected by filtration; 2.23 g. (95%); melting point 210–215° C. (dec.). Recrystallization from acetone raises the melting point to 227° C. (dec.); $[\alpha]_D^{25}$ —26° (chloroform)

$\nu_{max.}^{KBr}$ 3522, 1748, 1726, 1234 and 1050 cm.$^{-1}$

EXAMPLE 12

*Preparation of 21-Acetoxy-3,20-Bisethylenedioxy-9α-Fluoro-5,16-Pregnadien-11-One (XV)*

A solution of 21-acetoxy-3,20-bisethylenedioxy-9α-dioxy-9α-fluoro-17α-hydroxy-5-pregnen-11-one (XIV, Example 11) (2.03 g.) in pyridine (85 ml.) is chilled to —5° and thionyl chloride (8 ml.) is added. The mixture is allowed to stand overnight at —5°, and then poured into ice water. The oily mixture is extracted with ethyl acetate, the extract is washed with saturated saline, dried and evaporated. The residue is triturated with methanol and the crystalline product (XV) is collected by filtration to give 0.68 g. melting point 110–113°. An additional 0.1 g., melting point 110° is obtained by concentration of the mother liquor (combined yield, 37%). Recrystallization of the combined fractions from methanol raises the melting point to 126–129° C.; $[\alpha]_D^{25}$ —32° (chloroform);

$\nu_{max.}^{KBr}$ 1733, 1616, 1240 and 1042 cm.$^{-1}$

EXAMPLE 13

*Preparation of 3,20-Bisethylenedioxy-16α,21-Diacetoxy-9α-Fluoro-11β,17α-Dihydroxy-5-Pregnene (XIX)*

A solution of 21-acetoxy-3,20-bisethylenedioxy-9α-fluoro-5,16-pregnadien-11-one (XV, Example 12) (4.9 g.) in tetrahydrofuran (100 ml.) and benzene (20 ml.) is chilled to 0° and treated with lithium borohydride (1.5 g.) and stirred for five hours at room temperature. The mixture is carefully neutralized with acetic acid, water is added and the mixture is extracted with chloroform. The extract is washed with saturated saline solution, dried and evaporated. The semi-solid product is crystallized from acetone-petroleum ether to give 1.58 g., of 3,20-bisethylenedioxy-9α-fluoro - 11β,21 - dihydroxy-5,16-pregnadiene (XVI), melting point 202° C. (dec.). The mother liquor yielded an additional 1.00 g., melting point 199° C. (dec.) (combined yield 57%). A portion is recrystallized from the same solvent pair raising the melting point to 215–217° C., $[\alpha]_D^{25}$ —31° (chloroform);

$\lambda_{max.}^{MeOH}$ none; $\nu_{max.}^{KBr}$ 3440, 1622 and 1034 cm.$^{-1}$

A solution of 3,20-bisethylenedioxy-9α-fluoro-11β,21-dihydroxy-5,16-pregnadiene (XVI) (1.26 g.) and osmium tetroxide (0.75 g.) in benzene (250 ml.) and pyridine (1.2 ml.) is allowed to stand overnight at room temperature. The osmate ester is decomposed by the addition of water (50 ml.), methanol (21 ml.), potassium bicarbonate (3.5 g.) and sodium sulfite (3.5 g.). After the mixture is stirred for two hours, chloroform and water are added and the insoluble red precipitate removed by filtration. The layers are separated and the water layer extracted with additional chloroform. The chloroform extracts are combined, washed with water, dried and evaporated. This gives 0.75 g. of 3,20-bisethylenedioxy-9α-fluoro-11β,16α,17α,21 - tetrahydroxy-5-pregnene (XVII), melting point 235–236° C. The water layer is then re-extracted with chloroform, the extract washed with water, dried and evaporated to give an additional 0.63 g., melting point 230–231° C. (combined yield 100%). Crystallization from acetone-petroleum ether raised the melting point to 245–247° C.; $[\alpha]_D^{25}$ —28° (methanol);

$\nu_{max.}^{KBr}$ 3500 and 1056 cm.$^{-1}$

A solution of 3,20-bisethylenedioxy-9α-fluoro-11β,16α,17α,21-tetrahydroxy-5-pregnene (XVII) (1.05 g.) is acetylated in the usual manner by overnight treatment with acetic anhydride in pyridine solution. Ice water is added and the mixture is extracted with chloroform. The extract is washed with water and evaporated to give 1.11 g. (90%) of product (XIX), melting point 170–215° C. (dec. at 215°). The infrared spectrum is identical to that of the material prepared by procedure B (Example 14).

EXAMPLE 14

*Preparation of 3,20-Bisethylenedioxy-16α,21-Diacetoxy-9α-Fluoro-11β,17α-Dihydroxy-5-Pregnene (XIX)*

A solution of 21-acetoxy-3,20-bisethylenedioxy-9α-fluoro-5,16-pregnadien-11-one (XV, Example 12) (0.48 g.) in benzene (15 ml.) containing pyridine (0.3 ml.) is treated with osmium tetroxide (0.25 g.) and the mixture is allowed to stand overnight at room temperature. The osmium complex formed is then discharged by stirring for four hours with a mixture of benzene (50 ml.), methanol (7 ml.), potassium bicarbonate (1.7 g.) and sodium sulfite (1.7 g.). The red precipitate is removed by filtration and the filtrate diluted with chloroform. The extract is washed to neutral with water, dried and evaporated. This gives a solid residue which is crystallized from chloroform-acetone to give 126 mg. of 21-acetoxy-3,20-bisethylenedioxy-16α,17α-dihydroxy - 9α - fluoro - 5-pregnen-11-one (XVIII), melting point 262–264° C. Recrystallization from the same solvent pair gives material melting at 259–261°;

$\nu_{max.}^{KBr}$ 3414, 1738, 1703, 1246, 1103 and 1336 cm.$^{-1}$

A solution of 21-acetoxy-3,20-bisethylenedioxy-9α-fluoro-16α,17α-dihydroxy-5-pregnen-11-one (XVIII) (1.7 g.) in tetrahydrofuran (125 ml.) and benzene (25 ml.) is chilled to 0° and treated with lithium borohydride (1.5 g.) and stirred for five hours at room temperature. The mixture is carefully neutralized with acetic acid, water is added and the mixture is extracted with chloroform. The extract is washed with saturated saline solution, dried over anhydrous magnesium sulfate and evaporated. This gives 0.46 g., melting point 290° C. (dec.). The water layer is re-extracted with chloroform to give an additional 0.38 g., melting point >290° C. (dec.) (combined yield 51%). Recrystallization of a portion changed the melting point to 268° C. (dec.). Combustion analysis for this product indicates the formation of a cycloborate ester of 3,20-bisethylenedioxy - 9α-fluoro-11β,16α,17α,21-tetrahydroxy-5-pregnene.

A solution of 3,20-bisethylenedioxy-9α-fluoro-11β,16α, 17α,21-tetrahydroxy-5-pregnene-16,17 - cycloborate ester (0.5 g.) in pyridine (50 ml.) is treated with acetic anhydride (5 ml.) and allowed to stand overnight at room temperature. Methanol is added and the solvents removed by evaporation. The residue is dissolved in chloroform and the extract washed with water, dried and evaporated to give 0.42 g. (72%) of XIX, melting point 164–234° C. (dec. at 234°). Crystallization from acetone-petroleum ether gives a gelatin-like precipitate, melting point 147–183°. This material is dissolved in acetone, treated with decolorizing charcoal, filtered and evaporated, melting point 147–235° C. (dec. at 235°); $[\alpha]_D^{25}-46°$ (chloroform);

$\lambda_{max.}^{MeOH}$ none; $\nu_{max.}^{KBr}$ 3460, 1748, 1244 and 1050 cm.$^{-1}$

EXAMPLE 15

*Preparation of 16α,21-Diacetoxy-20-Ethylenedioxy-9α-Fluoro-11β,17α-Dihydroxy-4-Pregnen-3-One (XX)*

A solution of 3,20-bisethylenedioxy-16α,21-diacetoxy-9α-fluoro-11β,17α-dihydroxy-5-pregnene (XIX, Example 14) (1.0 g.) in aqueous acetic acid (75%, 40 ml.) is heated on the steam bath for one hour. Water is added and the mixture is extracted with chloroform. The extract is washed with saturated sodium bicarbonate solution and then to neutrality with water, dried and evaporated to give 0.77 g., melting point 158–250° C. (dec. at 250° C.).

EXAMPLE 16

*Preparation of Triamcinolone 20-Ethylene Ketal 16,21-Diacetate (16α,21-Diacetoxy-9α-Fluoro-20-Ethylenedioxy-11β,17α-Dihydroxy-1,4-Pregnadiene-3-One) (XXI)*

A solution of 16α,21-diacetoxy-20-ethylene-dioxy-9α-fluoro - 11β,17α - dihydroxy - 4 - pregnen - 3 - one (XX, Example 15) (0.51 g.) in dioxane (200 ml.) is refluxed with 2,3-dichloro-5,6-dicyano-1,4-benzoquinone (350 mg.) for 50 hours. The mixture is evaporated to dryness and the residue taken up in benzene. The benzene solution is washed with water, 1% potassium hydroxide (cold) and again water to neutrality. The extract is then evaporated to dryness to give 0.46 g. melting point 232° C. (dec.);

$\lambda_{max.}^{MeOH}$ 238 m$\mu$ ($\epsilon$13,100); $\nu_{max.}^{KBr}$ 3510, 1754, 1668, 1614, 1244 and 1062 cm.$^{-1}$

EXAMPLE 17

*Preparation of Triamcinolone 20-Ethylene Ketal (20-Ethylenedioxy - 9α - Fluoro - 11β,16α,17α,21 - Tetrahydroxy-1,4-Pregnadien-3-One*

A solution of 16α,21-diacetoxy-20-ethylenedioxy-9α-fluoro - 11β,17α -dihydroxy - 1,4 -pregnadien - 3 - one (XXI, Example 16) (0.45 g.) in methanol (75 ml., oxygen free) is treated with aqueous potassium carbonate solution (2.0 ml., 10% oxygen free) for one hour at room temperature under a nitrogen atmosphere. The mixture is carefully neutralized with glacial acetic acid and the solution evaporated to near dryness. Water is added to effect crystallization and the product collected by filtration to give 53 mg. (14%); melting point 224–230° C. (dec. at 258° C.); negative α-ketol blue tetrazoleum test. The filtrate is extracted with methyl isobutyl ketone, the extract washed with water, dried and evaporated to give a glass (168 mg.). Recrystallization of the crystalline fraction from acetone-petroleum ether raises the melting point to 235–236° C.

EXAMPLE 18

*Preparation of 9α-Fluoroprednisone 20-Ethylene Ketal (20 - Ethylenedioxy - 9α - Fluoro - 17α,21 - Dihydroxy-1,4-Pregnadiene-3,11-Dione, XXIV)*

A solution of 3,20-bisethylenedioxy-9α-fluoro-17α,21-dihydroxy-5-pregnen-11-one (XXII, Example 11) (550 mg.) in aqueous acetic acid (50 ml., 50%) is heated for 30 minutes on the steam bath. The clear solution is chilled and water is added producing a gummy precipitate. The mixture is extracted with chloroform, washed with saturated sodium bicarbonate solution and then to neutrality with saturated saline solution. The solution is dried over anhydrous magnesium sulfate and evaporated to give crystalline 9α-fluoro-cortisone 20-ethylene ketal (20 - ethylenedioxy - 9α - fluoro - 17α,21 - hydroxy - 4-pregnene-3,11-dione) (0.28 g. melting point 205–207° C.). The analytical sample is crystallized from acetone-petroleum ether; melting point 226–228° C.; $[\alpha]_D^{25}+102°$ (chloroform);

$\lambda_{max.}^{MeOH}$ 234 m$\mu$ ($\epsilon$16,500)

A mixture of 9α-fluorocortisone 20-ethylene ketal (1.0 g.) in pyridine (10 ml.) is treated with acetic anhydride (2 ml.) and allowed to stand overnight at room temperature. Water is added to effect crystallization and the product collected by filtration to give 1.09 g. (100%) of 9α-fluoro-cortisone 20-ethylene ketal 21-acetate (21 acetoxy - 20 - ethylenedioxy - 9α - fluoro -17α - hydroxy - 4-pregnene-3,11-dione, XXIII), melting point 227–229° C. Recrystallization from acetone-petroleum ether raises the melting point to 229–230° C.; $[\alpha]_D^{25}+111°$ (chloroform);

$\lambda_{max.}^{MeOH}$ 234 m$\mu$ ($\epsilon$17,600); $\nu_{max.}^{KBr}$ 3560, 1754, 1730, 1648, 1234 and 1050 cm.$^{-1}$ A solution of 464 mg. 1 mmole) of 21-acetoxy-20-ethylenedioxy - 9α - fluoro - 17α - hydroxy - 4 - pregnene-3,11-dione (XXIII) and 342 mg. 2,3-dichloro-5,6-dicyano-benzoquinone in 40 cc. dry dioxane is refluxed with stirring for 5 days and is then evaporated under reduced pressure. The residue is mixed with 60 cc. of benzene and is filtered. The filtrate is washed twice with 1% sodium hydroxide solution and with water till neutral. The benzene phase is dried and partially decolorized over magnesium sulfate and decolorizing charcoal and the filtered solution is evaporated and crystallized from methanol to give a solid containing 21-acetoxy-20-ethylenedioxy-9α-fluoro - 17α - hydroxy - 1,4 - pregnadiene - 3,11 - dione. The solid is stirred in 25 cc. of methanol with 1 cc. 10% aqueous potassium carbonate solution under nitrogen for one hour. The mixture is evaporated to a small volume, mixed with water and extracted with several portions of chloroform. The combined extracts are washed with a little water, dried over magnesium sulfate, filtered and evaporated under reduced pressure. The residue is chromatographed on diatomaceous earth with the system: cyclohexane-dioxane-water (60:40:8) and the product is obtained by pooling and evaporating the 3½–5 column volumes. The solid so obtained (138 mg.) is crystallized and recrystallized from methylene chloride-ether to give the product with melting point 239–240°. The substance is essentially pure $\Delta^{1,4}$-3-keto steroid as shown by polarographic analysis.

EXAMPLE 19

*Preparation of 21-Acetoxy - 17α - Hydroxy-20-Ethylenedioxy-9α-Fluoro-6α-Methyl-1,4-Pregnadiene-3,11-Dione*

To a cooled suspension of 0.75 g. chromic trioxide in 25 cc. pyridine is added slowly an ice-cold solution of 0.76 g. of 21-acetoxy-9α-fluoro - 11β,17α - dihydroxy-6α-methyl-1,4-pregnadiene-3,20-dione [G. B. Spero et al., J. Amer. Chem. Soc. 79, 1515 (1954)] in 25 cc. of pyridine. The resulting mixture is stirred in an ice-bath for 30 minutes and at room temperature for 16 hours. It is then poured into a mixture of ice-water and ethyl acetate. The organic phase is separated and the aqueous phase is extracted with several portions of ethyl acetate. The combined extracts are washed several times with water and are dried and partially decolorized over magnesium sulfate and charcoal. The filtered solution is evaporated under reduced pressure and the residue is crystallized and collected from ether to give 0.47 g. of 21 - acetoxy-9α-fluoro-17α-hydroxy-6α-methyl-1,4-pregnadiene-3,11,20-trione, melting point 210–214° C. The solid is dissolved in 10 cc. of methanol and nitrogen gas is bubbled through the solution while 1 cc. of 10% aqueous potassium carbonate solution is added. The mixture is kept at room temperature under nitrogen for one hour and is then neutralized with a few drops of glacial acetic acid. The mixture is evaporated under reduced pressure and the residue is distributed between ethyl acetate and water. The water phase is washed with a little ethyl acetate and the combined organic extracts are dried and partially decolorized over magnesium sulfate and charcoal. Filtration and evaporation gives a residue which crystallizes from ether (0.412 g.). Recrystallization from acetone-hexane gives 9α-fluoro-17α,21-dihydroxy-6α-methyl-1,4-pregnadiene-3,11,20-trione with melting point 205–207° C.

A mixture of 400 mg. of 9α-fluoro-17α,21-dihydroxy-6α-methyl-1,4-pregnadiene-3,11,20-trione, 35 cc. of benzene, 3 cc. of ethylene glycol and 15 mg. of p-toluenesulfonic acid is heated with vigorous stirring under reflux in a system which includes a water trap. After 5 hours refluxing, the mixture is cooled, diluted with 50 cc. of benzene and washed with saturated sodium bicarbonate solution and with water. The organic phase is dried over magnesium sulfate, filtered and evaporated under reduced pressure. The residue is dissolved in ether, decanted from a small amount of insoluble material and decolorized with activated charcoal. Evaporation gives 331 mg. of glass. This is further purified by chromatography on 35 g. of magnesium silicate (Florisil) from benzene solution. The material is eluted with acetone-methylene chloride and isolated by evaporation to give 20-ethylenedioxy-9α-fluoro-17α,21-dihydroxy-6α-methyl-1,4-pregnadiene-3,11-dione as a colorless glass. This is acetylated with 5 cc. of pyridine and 1 cc. of acetic anhydride at room temperature for 16 hours. The solution is added to ice water and the mixture is extracted with several portions of chloroform. The extracts are dried over magnesium sulfate, filtered and evaporated under reduced pressure. The residue is crystallized from ether to give 21-acetoxy-20-ethylenedioxy-9α-fluoro-17α,21-dihydroxy-6α-methyl-1,4-pregnadiene-3,11-dione as a white solid with melting point 214–216° (negative blue tetrazolium test).

EXAMPLE 20

*Preparation of 2-Ethoxalyl-20-Ethylenedioxy-6α-Methyl-11β,17α,21-Trihydroxy-4-Pregnen-3-One*

To a dry solution of 2 g. (4.76 mmole) of 20-ethylenedioxy-6α-methyl-11β,17α,21-trihydroxy-4-pregnen-3-one (VII, Example 5) in 75 cc. of benzene is added 3.9 cc. of ethyl oxalate and then under a blanket of nitrogen 1 g. of sodium hydride (50% oil dispersion) and 0.5 cc. of absolute ethanol. The mixture is stirred under nitrogen for 24 hours, diluted with 50 cc. of benzene and 2 cc. of ethanol and extracted with three 40 cc. portions of water. The combined extracts (dark yellow) are washed with ether and are neutralized with 30% aqueous sodium dihydrogen phosphate solution. The mixture is thoroughly extracted with chloroform and the combined extracts are washed once with water, dried over magnesium sulfate, filtered and evaporated under reduced pressure to give 1.23 g. of 2-ethoxalyl-20-ethylenedioxy-6α-methyl-11β,17α,21-trihydroxy-4-pregnen-3-one as a yellow glass (positive ferric chloride test).

EXAMPLE 21

*Preparation of 2α,6α-Dimethyl-20-Ethylenedioxy-11β,17α,21-Trihydroxy-4-Pregnen-3-One*

The ethoxalyl derivative from Example 20 is dissolved in dry acetone (30 cc.) and there is added 2.5 g. of micronized, anhydrous potassium carbonate and 2 cc. of methyl iodide. The mixture is stirred for 24 hours and then for another 48 hours with an additional 2 cc. portion of methyl iodide. The mixture is filtered and the filtrate is evaporated under reduced pressure to give 1.09 g. of a glass containing 2-ethoxalyl-20-ethylenedioxy-11β,17α,20-trihydroxy-2,6α-dimethyl-4-pregnen-3-one. This is dissolved in 30 cc. of methanol containing 1.6 g. of anhydrous potassium acetate and the stirred mixture is refluxed for 2 hours, evaporated under reduced pressure and the residue (740 mg.) is chromatographed on a Celite (diatomaceous earth) column from the system: ethyl acetate-heptane-methanol-water (20:80:12:8). The desired product is eluted in the 5½–7½ column volume and is isolated by evaporation of pooled fraction and crystallization from ether-methylene chloride; 130 mg., melting point 221–223°, $[\alpha]_D^{25} +54°$ (c. 0.5 in CHCl$_3$);

$\lambda_{max.}^{MeOH}$ 243 mμ, (ε 13,400)

EXAMPLE 22

*Preparation of 21-Acetoxy-20-Ethylenedioxy-2α,6α-Dimethyl-11β,17α-Dihydroxy-1,4-Pregnadien-3-One*

A solution of 23 mg. 20-ethylenedioxy-2α,6α-dimethyl-11β,17α,21-trihydroxy-4-pregnen-3-one (Example 21) in 1 cc. of pyridine and 0.3 cc. of acetic anhydride is kept at room temperature overnight. The mixture is evaporated at room temperature and the residue is dissolved in 5 cc. of chloroform, washed with a little water, dried over sodium sulfate, filtered, evaporated under reduced pressure and reevaporated with toluene to remove last traces of pyridine. The residual 21-acetoxy-11β,17α-dihydroxy-2α,6α-dimethyl-20-ethylenedioxy-4-pregnen-3-one is dissolved in 3 cc. dry dioxane and 17 mg. of 2,3-dichloro-5,6-dicyanobenzoquinone is added. The mixture is allowed to reflux for 3 days and is then evaporated under reduced pressure. The residue is taken up in 7 cc. of benzene, filtered and washed with 1% aqueous potassium hydroxide solution and with water till neutral. The organic phase is dried over sodium sulfate, filtered and evaporated under reduced pressure. The residue is crystallized from acetone-hexane to give 13 mg. of the product with melting point 163–168°;

$\lambda_{max.}^{KBr}$ 5.72μ (m), 6.01μ (s), 6.15μ (s)

The substance is shown to be 92–95% pure Δ$^{1,4}$-3-keto steroid by polarography.

EXAMPLE 23

*Preparation of 21-Acetoxy-20-Ethylenedioxy-9α-Fluoro-17α-Hydroxy-16α-Methyl-1,4-Pregnadiene-3,11-Dione*

A solution containing 1.6 g. (0.0037 mole) of 21-acetoxy-11β,17α-dihydroxy-9α-fluoro-16α-methyl-1,4-pregnadiene-3,20-dione [G. E. Arth et al., J. Amer. Chem. Soc., 80, 3161 (1958)] in glacial acetic acid (20 ml.) is chilled to 15° C. and a solution of chromium trioxide (0.47 g., 0.00453 mole) in 1 ml. of water and 10 ml. of glacial acetic acid is added. The reaction mixture is stirred at room temperature for one hour. Water (100 ml.) is added and the mixture is thoroughly extracted with chloroform. The combined chloroform extracts are washed well with water, saturated sodium bicarbonate solution and then with water again. After drying, evaporation of the solvent gives 21-acetoxy-17α-hydroxy-9α-fluoro-16α-methyl-1,4-pregnadiene-3,11,20-trione as a glass (1.6 g.) which resists crystallization. The glass is dissolved in methanol (40 ml., oxygen free) and de-O-acetylated with potassium carbonate (3.4 ml., 10% solution, oxygen free) in the usual manner. Neutralization with acetic acid (0.24 ml.) and the addition of water gives crystalline 21,17α-dihydroxy-9α-fluoro-16α-methyl-1,4-pregnadiene-3,11-dione, which is filtered, washed with water and dried; yield, 0.96 g. (67%); melting point 226–229° C. Recrystallization of a portion from acetone-petroleum ether raises the melting point to 249–252° C., $[\alpha]_D^{25} +131°$ (chloroform);

$\lambda_{max.}^{MeOH}$ 233–235 mμ (ε 15,500); $\nu_{max.}^{KBr}$ 3338, 1727, 1712 (shoulder), 1668, 1622 and 1606 cm.$^{-1}$ An azeotrope is distilled from a benzene solution (100 ml.) of 21,17α-dihydroxy-9α-fluoro-16α-methyl-1,4-pregnadiene-3,11-dione (0.5 g.). Ethylene glycol (8 ml.) and p-toluenesulfonic acid (25 mg.) is added and the mixture is refluxed for six hours with constant water take-off. After cooling, sodium carbonate is added, the solvent is evaporated, water is added and the product is extracted with ethyl acetate. Evaporation of the solvent gives a glass, which on crystallization with acetone-ether-petroleum ether gives 111 mg., melting at 237–247° and giving a positive blue tetrazolium α-ketol test. The mother liquor from this crystallization was combined with the initial glass (negative α-ketol test) obtained from a similar experiment starting with 112 mg. of dione.

The combined amorphous material is chromatographed on silica gel (30 g.). Chloroform elutes a glass (0.37 g.) showing a negative α-ketol test. Further elution with acetone gives 0.21 g. glass with a weak positive α-ketol test. The material (17α,21-dihydroxy-20-ethylenedioxy-9α - fluoro - 16α - methyl-1,4-pregnadiene-3,11-dione) obtained by chloroform elution resists crystallization. It is acetylated in pyridine (10 ml.) with acetic anhydride (4 ml.) by standing overnight at room temperature. The usual workup gives a glass, which is dissolved in benzene and chromatographed on silica gel (30 g.). Acetone elutes an amorphous product (0.25 g.) which is submitted to partition chromatography on Celite (diatomaceous earth) using the system heptane:methanol and the effluent is passed through a recording spectrophotometer set at 240 mμ. The first fraction containing ultra-violet-absorbing material is obtained at hold-back volume 4; a second fraction occurring at hold-back volumes 7 and 8 is discarded. The first fraction on evaporation of solvent gives solid material (negative α-ketol test) which on recrystallization from acetone-petroleum ether gives 40 mg. of the desired 20-ketal 21-acetate, melting point 203–204° C.

We claim:
1. A compound having the formula:

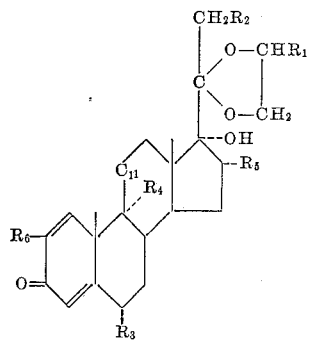

wherein $C_{11}$ is a divalent radical of the group consisting of

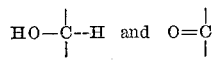

$R_1$ is a member of the group consisting of hydrogen and lower alkyl radicals; $R_2$ is a member of the group consisting of hydrogen, hydroxyl and lower alkanoyloxy radicals; $R_3$ is a member of the group consisting of hydrogen and lower alkyl radicals; $R_4$ is a member of the group consisting of hydrogen and fluorine, $R_5$ is a member of the group consisting of hydrogen, hydroxyl, lower alkanoyloxy and lower alkyl radicals and when $R_5$ is lower alkyl then $R_3$ and $R_6$ are hydrogen and $R_6$ is a member of the group consisting of hydrogen and lower alkyl radicals.

2. The compound 17α,21-dihydroxy-20-ethylene-dioxy-1,4-pregnadiene-3,11-dione.

3. The compound 17α,21-dihydroxy-20-ethylene-dioxy-6α-methyl-1,4-pregnadiene-3,11-dione.

4. The compound 20-ethylenedioxy-6α-methyl-11β,17α,21-trihydroxy-1,4-pregnadien-3-one.

5. The compound 21-acetoxy-11β,17α-dihydroxy-20-ethylenedioxy-6α-methyl-1,4-pregnadien-3-one.

6. The compound 21-acetoxy-17α-hydroxy-20-ethylenedioxy-9α-fluoro-6α-methyl-1,4-pregnadiene-3,11-dione.

7. The compound 20-ethylenedioxy-9α-fluoro-17α-hydroxy-6α-methyl-1,4-pregnadiene-3,11-dione.

8. The compound 20-ethylenedioxy-9α-fluoro-11β,16α,17α,21-tetrahydroxy-1,4-pregnadien-3-one.

9. The compound 20-ethylenedioxy-9α-fluoro-17α,21-dihydroxy-1,4-pregnadiene-3,11-dione.

10. The compound 2-ethoxalyl-20-ethylenedioxy-6α-methyl-11β,17α,21-trihydroxy-4-pregnen-3-one.

11. The compound 21-acetoxy-11β,17α-dihydroxy-2α,6α-dimethyl-20-ethylenedioxy-4-pregnen-3-one.

12. A process of preparing 20-lower alkylenedioxy-17α,21-dihydroxy-1,4-pregnadiene-3,11-diones which comprises contacting a 17α,21-dihydroxy-1,4-pregnadiene-3,11,20-trione with a 1,2-lower alkylenediol in the presence of a strong acid.

13. A process of preparing 20-ethylenedioxy-17α,21-dihydroxy-1,4-pregnadiene-3,11 - diones which comprises contacting a 17α,21-dihydroxy-1,4-pregnadiene-3,11,20-trione with ethylene glycol in the presence of a strong acid.

References Cited in the file of this patent
UNITED STATES PATENTS

| | | |
|---|---|---|
| 2,837,464 | Nobile | June 3, 1958 |
| 2,867,631 | Lincoln et al. | Jan. 6, 1959 |
| 2,975,171 | Poos | Mar. 14, 1961 |

OTHER REFERENCES

Evans et al.: J.C.S. 1958, pp. 1529–1543.

UNITED STATES PATENT OFFICE
CERTIFICATE OF CORRECTION

Patent No. 3,069,417

December 18, 1962

Martin J. Weiss et al.

It is hereby certified that error appears in the above numbered patent requiring correction and that the said Letters Patent should read as corrected below.

Column 3, formula "VIII" should appear as shown below instead of as in the patent:

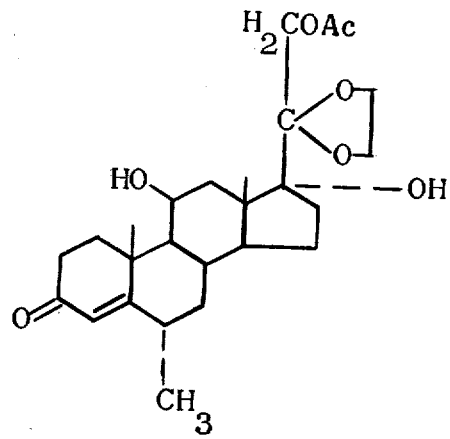

same column 3, formula "IX" should appear as shown below instead of as in the patent:

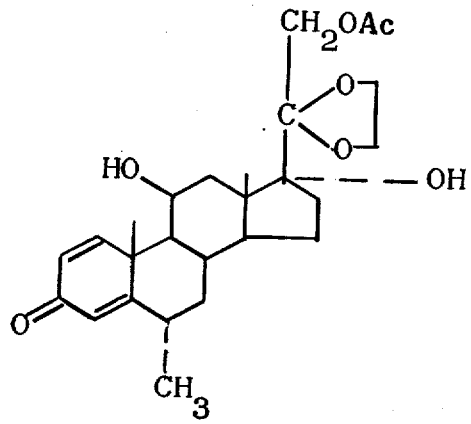

column 11, line 8, for "680" read -- 68° --; column 13, lines 39 and 40, strike out "9α-dioxy-"; column 16, line 6, for "hydroxy" read -- dihydroxy --.

Signed and sealed this 3rd day of September 1963.

(SEAL)
Attest

ERNEST W. SWIDER
Attesting Officer

DAVID L. LADD
Commissioner of Patents